(12) United States Patent
St. Germain et al.

(10) Patent No.: US 7,247,011 B2
(45) Date of Patent: Jul. 24, 2007

(54) APPARATUS FOR MOLDING FOOD PRODUCTS

(76) Inventors: Barett A. St. Germain, 453 Haight Ave., Alameda, CA (US) 94501; Andrew Millson, 453 Haight Ave., Alameda, CA (US) 94501

( * ) Notice: Subject to any disclaimer, the term of this patent is extended or adjusted under 35 U.S.C. 154(b) by 334 days.

(21) Appl. No.: 10/886,175

(22) Filed: Jul. 6, 2004

(65) Prior Publication Data
US 2006/0006581 A1    Jan. 12, 2006

(51) Int. Cl.
*A21C 11/18*    (2006.01)
*B29C 43/04*    (2006.01)

(52) U.S. Cl. .................. 425/87; 425/318; 425/355; 425/454; 426/512; 426/518

(58) Field of Classification Search .................. 425/87, 425/318, 352, 355, 453, 454, DIG. 57; 426/512, 426/518
See application file for complete search history.

(56) References Cited

U.S. PATENT DOCUMENTS

| | | | |
|---|---|---|---|
| 3,685,936 A | * | 8/1972 | Meth et al. .......... 425/DIG. 57 |
| 3,943,602 A | | 3/1976 | Siclari |
| 4,081,169 A | * | 3/1978 | Lauter .................. 425/374 |
| 4,106,162 A | | 8/1978 | Fournier |
| 4,765,029 A | | 8/1988 | Rogan |
| 5,030,405 A | * | 7/1991 | Smith et al. ............ 425/318 |
| 5,112,634 A | | 5/1992 | Swearingen |
| D369,948 S | | 5/1996 | Tobiasz |
| 6,398,540 B1 | | 6/2002 | Burroughs et al. |
| 6,644,953 B2 | * | 11/2003 | Kishek .................. 425/318 |

* cited by examiner

*Primary Examiner*—Tim Heitbrink
*Assistant Examiner*—Thu Khanh T. Nguyen
(74) *Attorney, Agent, or Firm*—Harris Zimmerman

(57) ABSTRACT

A patty forming system which includes a first generally disc-like mold chamber and a second loading chamber in which a manually operated plunger is mounted for reciprocal movement. When the plunger is moved towards the mold chamber, the mass of material from which a patty is to be formed will be forced into the mold chamber and be molded into the shape of such chamber. Preferably the diameter of the mold chamber is variable depending upon the quantity of material forced into such chamber by the plunger. An automatic spring loaded patty ejector may also be incorporated with the plunger mechanism to facilitate removal of the patty from the mold chamber.

7 Claims, 4 Drawing Sheets

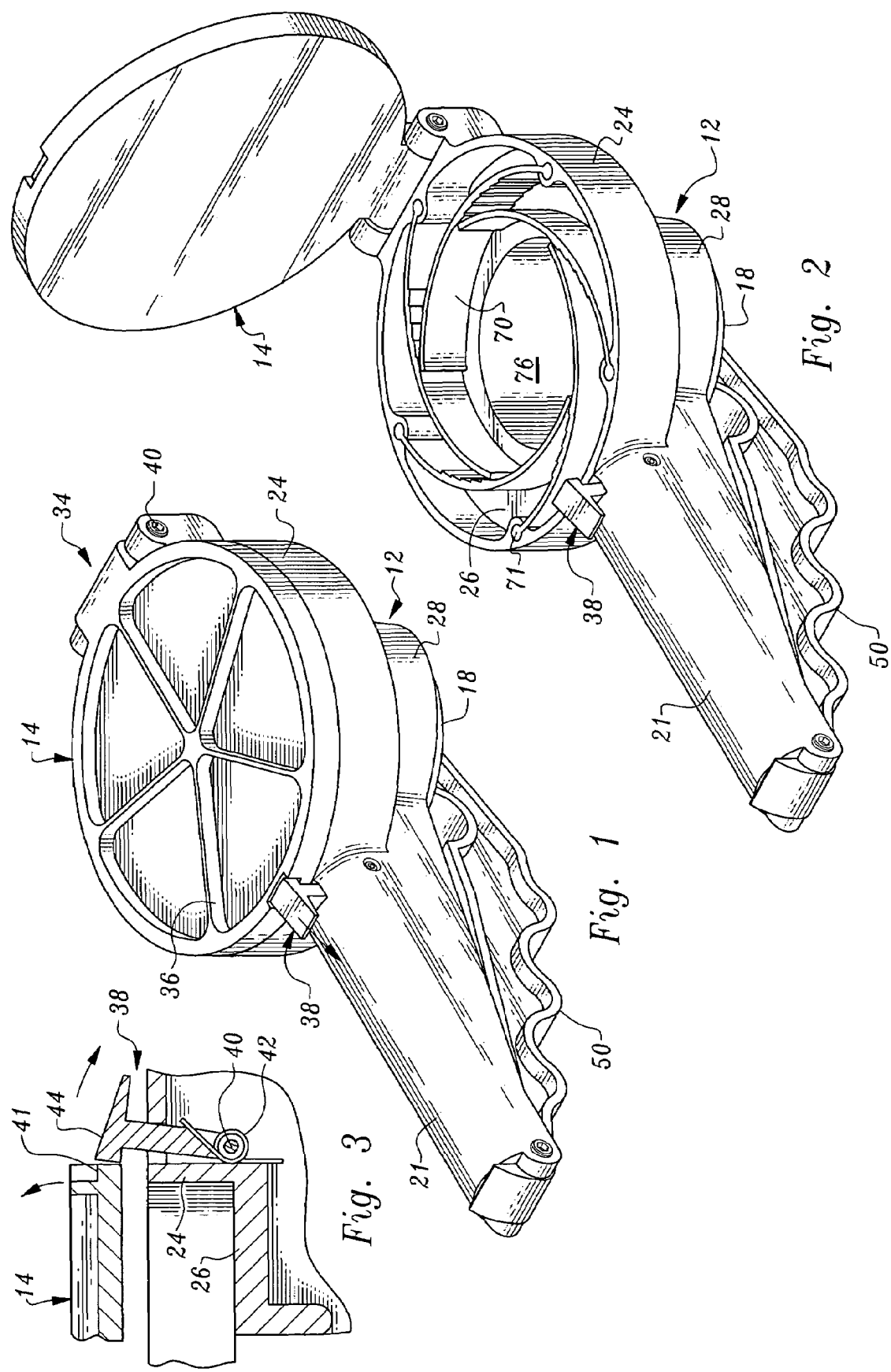

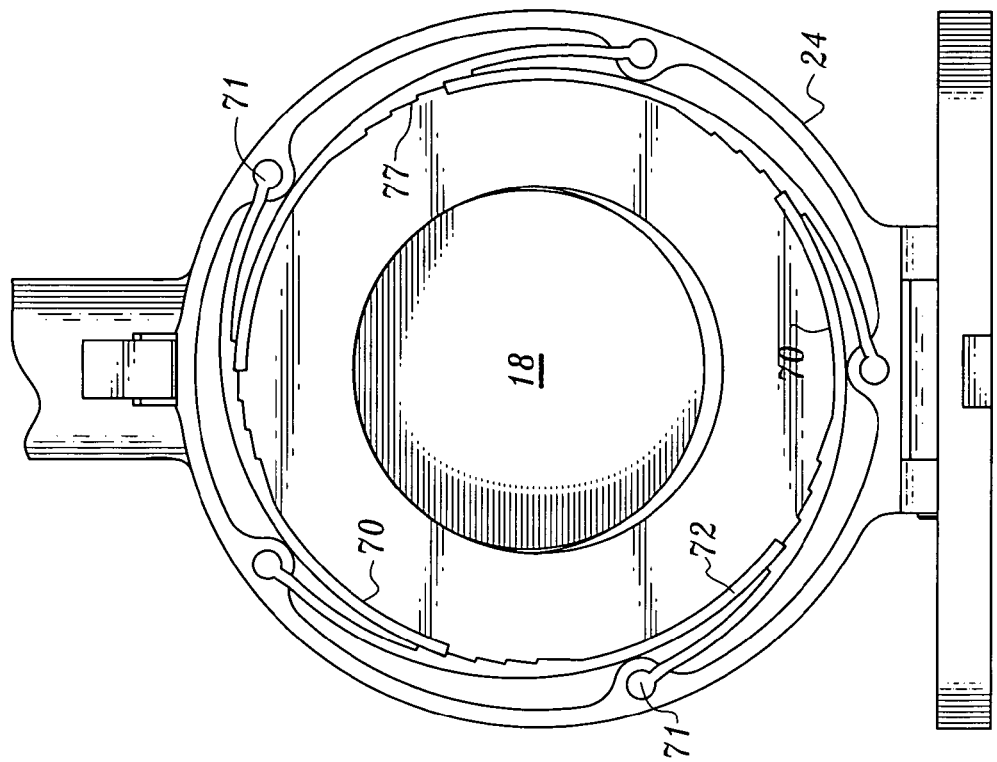
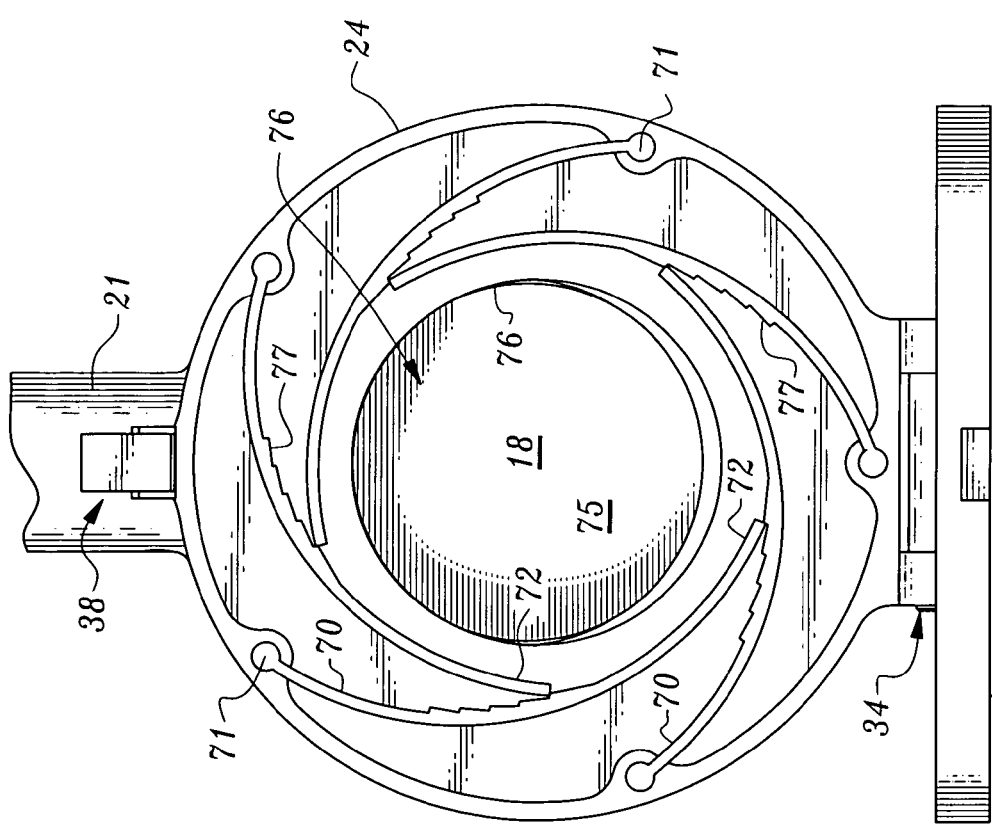

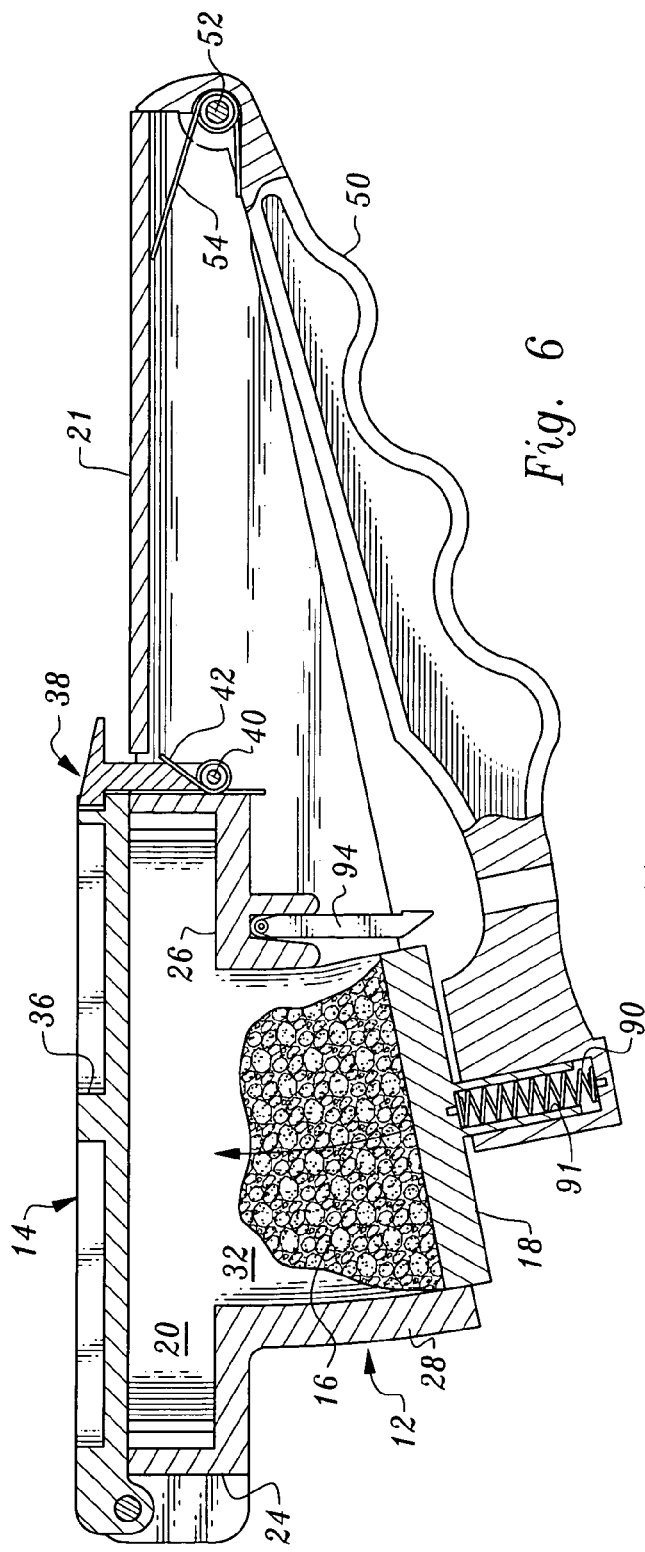
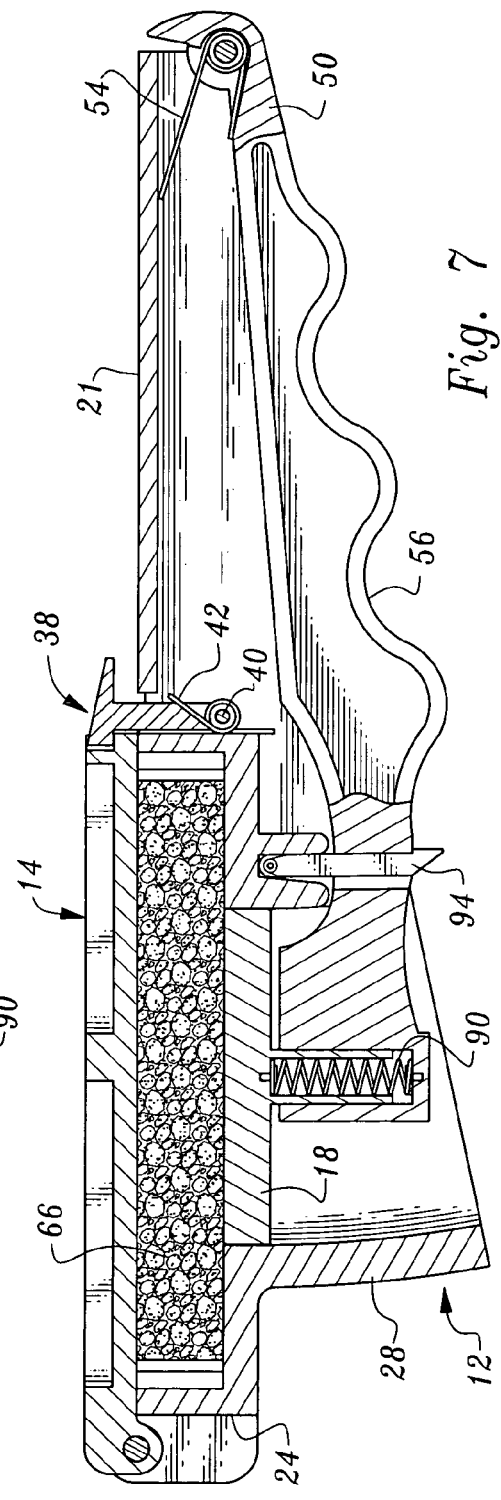

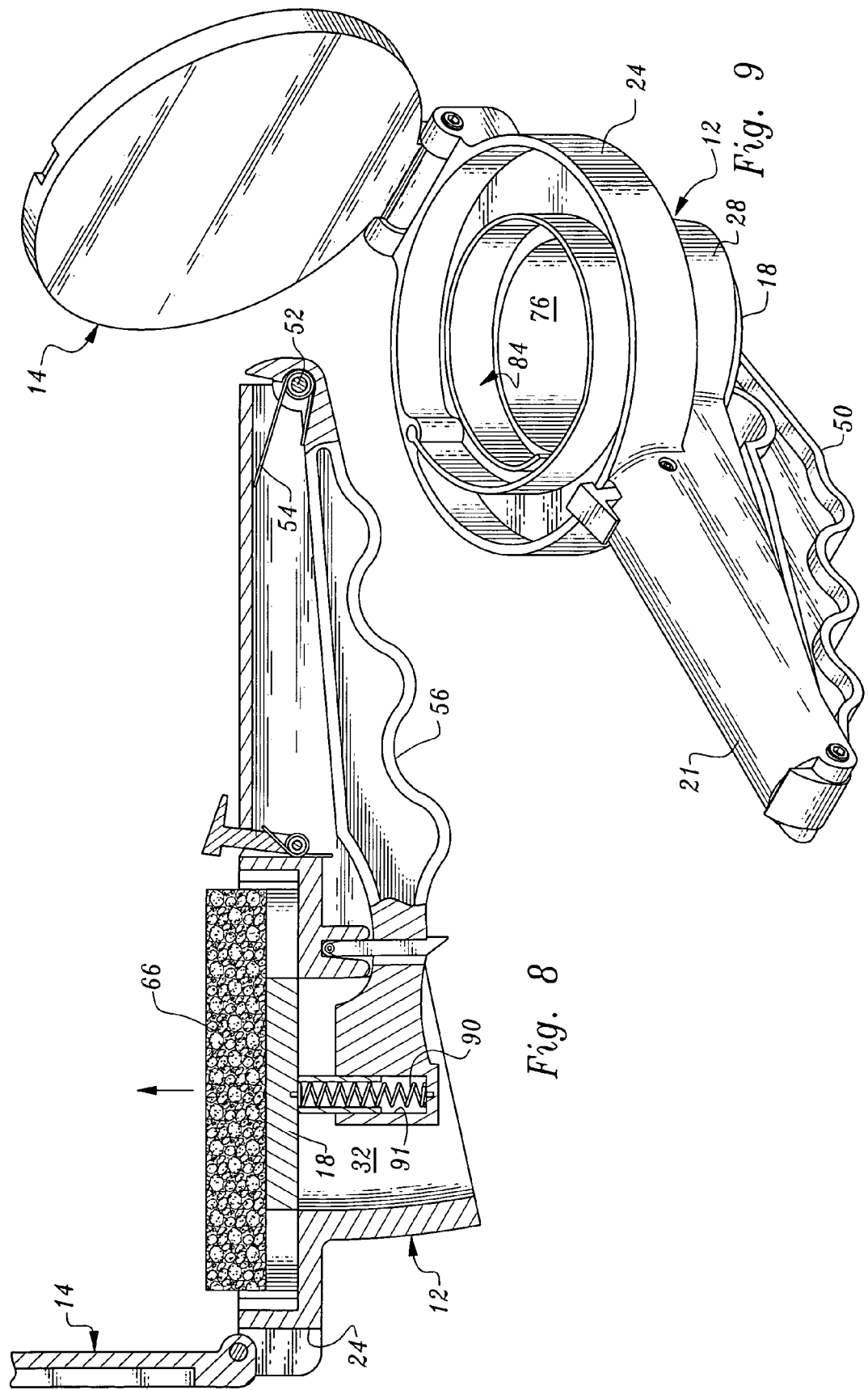

APPARATUS FOR MOLDING FOOD PRODUCTS

CROSS-REFERENCE TO RELATED APPLICATION (Not Applicable)

STATEMENT REGARDING FEDERALLY SPONSORED RESEARCH OR DEVELOPMENT (Not Applicable)

BACKGROUND OF THE INVENTION

The present invention is directed to an apparatus and method for forming molded food products, such as ground beef patties for grilling or other cooking of the product. However, the structure and method disclosed and claimed herein is generally applicable to forming other disc-like elements such as cookie dough, or even non-food items. Numerous devices and systems are disclosed in the prior art, but such art fails to provide a manual operable device, which can be simply used and controlled by one hand of the user, whether ground meat, cookie dough, or other moldable product is to be formed.

BRIEF SUMMARY OF THE INVENTION

It is accordingly an object of the present invention to provide a manually operable patty forming device which will produce patties of regular thickness and diameter.

Another object of the invention is to provide a system and method of manually producing patties from a mass of moldable material in which the molded patties will each have a generally uniform thickness and a well defined cylindrical shape, generally irrespective of the quantity of product placed in the apparatus.

A further object of this invention is to provide a device in which the molding portion has a cylindrical chamber of generally constant depth along its axis of the cylinder, but of a variable expandable diameter, the size of the diameter depending upon the quantity of material being used.

An additional object of the invention is to provide a system as above described in which a manually operated plunger is actuated to force a mass of material into a mold chamber.

Another object of this invention is to provide a simple system incorporated in the molding chamber for facilitating ejection of the molded patty out of the mold cavity.

With these and other objects in mind, the present invention provides a system for making uniform patties with a simple device which may be operated by one hand of the user. The device includes a patty forming chamber, preferably having means therein for permitting patties of different diameters to be formed therein, depending on the quantity of moldable product loaded into the chamber. The device further includes a plunger or ram movable in a loading chamber. When the plunger is actuated, such as by squeezing of a handle on which the plunger is mounted, the plunger will move through the loading chamber and urge the material into a mold chamber. The mold chamber has an open top through which product may be loaded through the mold chamber and into the loading chamber, and a lid or cover which will close such open top during the molding operation and provide an upper portion of the mold chamber.

BRIEF DESCRIPTION OF THE DRAWINGS

In the accompanying drawings:

FIG. 1 is a front perspective view with the cover or lid in a closed operative position.

FIG. 2 is a view similar to FIG. 1 but with the cover or lid in an open condition for receiving product to be molded and/or for ejecting the molded patties.

FIG. 3 is a partial cross-sectional view of the detent device for releasably locking the cover.

FIG. 4 is a top plan view with the cover removed and illustrating the expandable patty forming strips in their normal minimum sized patty position.

FIG. 5 is a view similar to FIG. 4 with the strips expanded into their maximum sized patty defining positions.

FIG. 6 is a side view, partially in cross-section, of the parts after loading of the material into the loading chamber and closing and locking the cover.

FIG. 7 is a view similar to FIG. 6, but with the plunger or ram actuated by squeezing of the handles.

FIG. 8 is a side view, similar to FIG. 6, illustrating the position of the parts after the patty is formed, with the ejector moving the patty out of the mold chamber.

FIG. 9 is a view similar to FIG. 2, with a modified form of diameter size control means.

DESCRIPTION OF THE PREFERRED EMBODIMENTS

In broad terms, the patty former of the present invention includes a raw product receiving section 12; a lid or cover section 14 which selectively opens section 12 for loading product 16, such as ground meat, into section 12, or closes section 12 during the patty forming operation; and a manually operable plunger or ram 18, which urges material placed in receiving section 12 into a patty forming chamber 20, defined by the lid section 14, the upper surface of plunger 18, and expandable side wall portions of the chamber 20 which will be later described in greater detail.

Receiving section 12 and patty forming section 20 are in a body which includes a manually engagable fixed handle 21 with a proximal end portion terminating in a first cylindrical wall 24. Extending radially inwardly from the lower edge of the wall 24, is a normally related annular flange or base 26. The radially outermost edge of the base is coterminous with the lower edge of the wall 24. The radially innermost edge of the base is coterminous with a second generally cylindrical wall 28 along generally the same axis as wall 24, but of a smaller diameter, and disposed on one side of the plane defined by base 26 while wall 24 is on the other side of such plane.

As will be seen, wall 24 and base 26 define the top opening chamber 20, and wall 28 defines the bottom opening receiving chamber 32 in free communication with chamber 20.

Lid section 14 is pivotally attached to the outside of the wall 24 defining the mold chamber 20 by means of a pivot hinge 34. The lid 14 is of generally disc-like configuration and of a size so that when disposed in overlying relationship to the upper edge of wall 24, will effectively form a seal between the lid and chamber 20 and consequently form an upper closure for the mold chamber 20.

While not essential to the operation, the major portions of the apparatus are preferably formed of a suitable substantially rigid injection molded plastic. Thus, to reduce the thickness of certain parts, such as lid 14, reinforcing ribs 36 may be provided to add strength to such parts.

In order to maintain the lid 14 in its closed position, a detent 38 may be attached to wall 24, diametrically opposite to the pivot hinge 34 by means of a pivot 40 or the like. As best shown in FIG. 3, the detent 38 is mounted on pivot 40 and is provided with a torsion spring 42, which serves to urge a lip of the detent into overlying relationship with a peripheral edge portion 41 of the lid 14. When it is desired to open the lid from the closed, locked position of FIG. 1, the user may manually pivot extension 44 against the pressure of spring 40 and thereby permit the lid to be pivoted into an open position as shown in FIG. 2.

In accordance with the present invention, plunger 18 is preferably carried on one end of a manually operable handle 50, whose other end is pivotally attached to the distal end of the fixed handle 21 by a pivot pin 52 or the like. A torsion spring 54 normally urges handle 50 away from the handle 21 as show in FIG. 6. However, when squeezing the handles together, as shown in FIG. 7, against the pressure of the spring 54, the handles will move into contiguous relationship and the plunger 18 will be moved into a position parallel to lid 14 thereby creating a cylindrical patty forming chamber heretofore designated as chamber 20. In this operative position, the upper surface of the plunger will be substantially coplanar with the upper surface of flange 26. Finger grooves 56 may be provided on the under surface of handle 50 so as to facilitate the squeezing action.

If the plunger was permitted to move directly along the axis of chamber 32, the wall through which the plunger passes, could be cylindrical and aligned with the cylindrical mold chamber 20. However, because the plunger is pivoted about an axis spaced from the axis of chamber 20, the plunger necessarily follows an arcuate, rather than a straight linear path and accordingly, the wall 28 defining the chamber 32 has an axis generally following said arcuate path.

In operating this device, the parts may initially be in the position illustrated in FIG. 2, i.e., with the lid 14 open, and the plunger 18 at the bottom of loading chamber 32, due to the force of spring 54 urging handles 21 and 50 apart. A quantity of ground meat or other material 16, from which the patty 66 is to be formed, is loaded into the chamber 32 by dropping the same through the chamber 20. Experience will dictate the approximate quantity of product to be loaded.

The user will then close lid 14 after opening detent 38, and lock the lid in closed position by spring 42 urging the detent into its locked position shown in FIG. 6. Holding the device in one hand, the user will urge handle 50 towards handle 21 against the pressure of spring 54. This will cause the plunger 18 to move towards the chamber 20 and lid 14, effectively transferring the mass of material 16 from chamber 32 into the diametrically larger, but axially shorter patty forming chamber 20. Because the lid is closed, actuation of the plunger will cause material 16 to enter the chamber 20 and spread out radially into the generally flat cylindrical shape of the chamber, which defines the size and shape of the patty 16.

By releasing the detent 38, and opening the lid, the formed patty 16 may then be removed as will later be described in greater detail.

The structure and operation described above, would be adequate if a single size and shaped patty was consistently desired. In other words, the inner surface of wall 24 will define the outer perimeter of the patty. However, a user will frequently wish to create patties of lesser diameter than that defined by chamber wall 24 and the chamber 20.

Accordingly, as a feature of the present invention, means are provided to have patties of lesser diameter when smaller quantities of product 16 are loaded into the device. Such means are intended to automatically produce cylindrical patties of varying diameters, depending on the quantity of material being handled.

As best illustrated in FIGS. 2, 4, and 5, one means for automatically adjusting the effective diameter of chamber 20 and accordingly, the patty diameter, is provided. A plurality of strips 70 are provided, each strip having one end pivotally attached at 71 to the interior of wall 24 along equally spaced portions along the periphery thereof. There are five of such strips shown in FIGS. 2, 4, and 5. Each strip has a width which corresponds to the height of chamber 20, i.e., the spacing between flange 26 and lid 14. The strips may be formed of plastic and have a length approximately equal to the one-third the length of the inner periphery of wall 24, but this length is not critical. Each strip is generally arcuate along its length, but with a radius of curvature capable of being deformed into a strip having a greater radius of curvature. It will be seen that the free end portion 72 of each strip lies between two other adjacent strips. In the normal unloaded condition of the strips, as shown in FIGS. 2 and 4, the inwardly facing surface portions of the strips face the axis of chamber 20 and collectively provide with lid 14, flange 26 and top 75 of plunger 18, a generally cylindrical enclosure 76 within chamber 20 but of a lesser diameter. When material is pushed into the enclosure 76 by actuation of plunger 18, and with the lid 14 closed, the enclosure 76 is filled, and further material forced upwardly by the plunger will cause the strips 70 to deflect radially outwardly, thereby increasing the effective diameter or size of the enclosure. When completely filled, the strips 70 will lie adjacent the inner surface of the wall 24 as shown in FIG. 5, and provide the maximum diameter for the patty being formed.

Preferably, the inner surface of each strip is corrugated or provided with notches 77 at a medial portion along its length. These notches are engaged by the end of the strip adjacent to the same and releasably hold the strips in their variable expanded or diametrically enlarged condition.

FIG. 9 discloses a modified form of means to provide patties of smaller diameter than that shown in FIGS. 2, 4, and 5.

Here, in place of a plurality of strips 70, a single strip 84 is positioned in chamber 20 in the nature of a coil. One end of the strip is pivotally connected at 85 to the inner surface of wall 24. One or more convolutions of the strip result in the distal end 86 of the strip being closer to the axis of chamber 20 than the wall surface 28. Again, as product is pushed into the mold chamber by actuation of plunger 18, the chamber will fill, and upon additional product being added, the strip 84 will be forced radially outwardly, thereby increasing the size of chamber 87 and the resulting patty.

In dealing with products such as ground meat, there may be a tendency for the molded product to adhere to the surfaces of the plunger 18 and the inner surfaces of strips 70 or strip 84, making it difficult to remove the molded patty 66 from the device. An ejection system may be employed to assist in patty removal, and this is best illustrated in FIGS. 6, 7, and 8 of the drawings. The end of handle 50 on which plunger 18 is effectively mounted has a relatively weak coil spring 90 disposed in a bore 91 of the handle 50. The upper end of the spring engages the bottom surface of plunger 18. After product is loaded in chamber 32, the cover is closed and locked, and the handles squeezed. The handles will releasably lock in the position shown in FIG. 7. This locking results from a detent finger 94 attached to and depending from handle 21 movable through a hole in handle 50. With the handles in their closed position, detent 94 engages and holds the handle 50 closed against the opening force imposed by spring 54. At this time, the upper surface of plunger 18 will be substantially coplanar with the upper surface of flange 26.

Spring 90 is not sufficiently strong to cause the plunger to enter the mold chamber. However, upon completion of the molding process, and with the handles still closed, upon opening of the lid or cover 14, the spring 90 will urge the plunger upwardly and assist in releasing the patty from the chamber. In practice, it has been found that the patty will frequently stay in place on the inside of the lid, and the user may merely open the lid a small distance, permit the plunger to enter chamber 20, and force the patty into further contact with the lid. The lid may then be fully opened and the patty easily removed. The detent 94 is then pushed sideways in hole 94, permitting spring 54 to urge the handles into their open position.

To further assist in removal of the formed patty 66 from the mold chamber 20, the strips 70 and/or the strips 84 which define the periphery of the patty may be molded with a small draft, e.g., five degrees, so that the upper edge of the strip or strips define a slightly larger diameter than the lower edge portion. This draft is useful in both removing the strip or strips from the patty forming mold and removal of the patty 66 from the chamber 20.

The invention claimed is:

1. Apparatus for forming a disc-like patty from a mass of moldable material, comprising means defining a disc-shaped mold chamber, a cover overlying said chamber and movable between open and closed positions, means defining a loading chamber in communication with and underlying said mold chamber, a plunger movable in said loading chamber from a first position spaced away from said mold chamber to a second position substantially coterminous with a lower surface of said mold chamber, manually engagable handle means for moving said plunger from said first position to said second position, and means are provided in said mold chamber for effectively varying the diameter thereof depending on the quantity of moldable material placed therein.

2. Apparatus as set forth in claim 1 in which said last name means includes at least one flexible arcuate strip having a proximal end attached to said mold defining means and a distal end disposed in said mold chamber, and said distal end being resiliently movable towards the mold defining means upon forcing of moldable material into said mold chamber, so as to effectively increase the diameter of said mold chamber.

3. Apparatus as set forth in claim 2 in which said strip has an upper edge portion spaced further from the axis of said mold chamber than its lower edge portion.

4. Apparatus as set forth in claim 2 in which a plurality of said strips are provided, the proximal end of each strip being attached to said mold defining means at a peripheral location spaced from the attachment of its adjacent strip.

5. Apparatus as set forth in claim 4 in which one surface of each strip has a plurality of teeth releasably engaged with a distal end of an adjacent strip.

6. Apparatus for forming a disc-like patty from a mass of moldable material, comprising a first cylindrical wall and an annular base extending radially inwardly from the lower edge portion of said wall, said wall having a central opening form therein, a second cylindrical wall extending generally downwardly from said base and aligned with said opening, a plunger movable within said second cylindrical wall from and towards said opening, a lid overlying said first cylindrical wall, means for reciprocating said plunger within said second wall, and means in said mold chamber for varying the diameter of said mold chamber and thereby varying the diameter of a patty formed therein.

7. Apparatus for forming a disc-like patty from a mass of moldable material, comprising a first cylindrical wall and an annular base extending radially inwardly from the lower edge portion of said wall, said wall having a central opening form therein, a second cylindrical wall extending generally downwardly from said base and aligned with said opening, a plunger movable within said second cylindrical wall from and towards said opening, a lid overlying said first cylindrical wall, means for reciprocating said plunger within said second wall, and in which said second wall has a generally arcuate axis along the length thereof and said plunger following said arcuate path during movement thereof.

* * * * *